(12) United States Patent
Hong

(10) Patent No.: US 7,233,376 B2
(45) Date of Patent: Jun. 19, 2007

(54) TRANSFLECTIVE LCD WITH REFLECTIVE ELECTRODE OFFSET FROM TRANSMISSILE ELECTRODE

(75) Inventor: Soon-Kwang Hong, Dae-gu (KR)

(73) Assignee: LG.Philips LCD Co., Ltd., Seoul (KR)

( * ) Notice: Subject to any disclaimer, the term of this patent is extended or adjusted under 35 U.S.C. 154(b) by 139 days.

(21) Appl. No.: 10/879,347

(22) Filed: Jun. 30, 2004

(65) Prior Publication Data
US 2005/0122451 A1 Jun. 9, 2005

(30) Foreign Application Priority Data
Dec. 5, 2003 (KR) .................. 10-2003-0087892

(51) Int. Cl.
*G02F 1/1335* (2006.01)
(52) U.S. Cl. ...................... 349/114; 349/113
(58) Field of Classification Search ............... 349/114
See application file for complete search history.

(56) References Cited
U.S. PATENT DOCUMENTS
5,798,806 A * 8/1998 Tsutsui et al. ............... 349/29

| | | | |
|---|---|---|---|
| 6,850,298 B2* | 2/2005 | Fujimori et al. | 349/114 |
| 7,023,508 B2* | 4/2006 | You | 349/113 |
| 2002/0071078 A1* | 6/2002 | Chung et al. | 349/123 |
| 2002/0093609 A1* | 7/2002 | Baek et al. | 349/113 |
| 2002/0109811 A1* | 8/2002 | Park et al. | 349/113 |
| 2004/0021807 A1* | 2/2004 | Narutaki et al. | 349/106 |
| 2004/0036827 A1* | 2/2004 | Tsuda et al. | 349/114 |

* cited by examiner

*Primary Examiner*—Andrew Schechter
*Assistant Examiner*—Phu Vu
(74) *Attorney, Agent, or Firm*—Morgan, Lewis & Bockius LLP

(57) ABSTRACT

An array substrate for a transflective liquid crystal display device includes a plurality of gate lines and a plurality of data lines disposed on a substrate and crossing each other to define a plurality of pixel regions, a thin film transistor adjacent to each crossing of the gate and data lines, a passivation layer covering the thin film transistor, a reflector in each pixel region and having an opening, the reflector overlapping the gate and data lines with an overlap width, and a transparent electrode in each pixel region and shifted in a first direction with respect to the reflector.

27 Claims, 10 Drawing Sheets

Backlight

TRANSFLECTIVE LCD WITH REFLECTIVE ELECTRODE OFFSET FROM TRANSMISSILE ELECTRODE

This application claims the benefit of Korean Patent Application No. 2003-087892, filed in Korea on Dec. 5, 2003, which is hereby incorporated by reference for all purposes as if fully set forth herein.

BACKGROUND OF THE INVENTION

1. Field of the Invention

The present invention relates to a liquid crystal display (LCD) device, and more particularly, to an array substrate and a transflective liquid crystal display device including the same.

2. Discussion of the Related Art

Liquid crystal display (LCD) devices have been regarded as next generation display devices providing high added value because of their low power consumption and high portability.

An LCD device is driven based on the optical anisotropy and polarization characteristics of a liquid crystal material. In general, an LCD device includes two substrates, which are spaced apart and facing each other, and a liquid crystal layer interposed between the two substrates. Each of the substrates includes an electrode. The electrodes from respective substrates face one the other. An electric field is induced between the electrodes by applying a voltage is applied to each electrode. An alignment direction of the liquid crystal molecules changes in accordance with a variation in the intensity or the direction of the electric field. The LCD device displays a picture by varying light transmittance according to the arrangement of the liquid crystal molecules.

Active matrix liquid crystal display (AMLCD) devices, which includes thin film transistors as switching devices for a plurality of pixels, have been widely used due to their high resolution and ability to display fast moving images. A related art LCD device will be described hereafter in detail with reference to FIGS. 1–3B.

FIG. 1 is a schematic view of a LCD device according to related art. In the LCD device, first and second substrates 10 and 30 are spaced apart from and facing each other. A liquid crystal layer 50 is interposed between the first substrate 10 and the second substrate 30. At least one gate line 12 and at least one data line 14 are formed on an inner surface of the first substrate 10, which is the side facing the upper substrate 30. The gate line 12 and the date line 14 cross each other to define a pixel region P. A thin film transistor T is formed as a switching element at the crossing of the gate line 12 and the data line 14. Although not shown in detail in FIG. 1, the thin film transistor T includes a gate electrode, a source electrode, a drain electrode, and an active layer. A plurality of such thin film transistors T is arranged in a matrix structure to correspond to other crossings of gate and data lines. A pixel electrode 16, which is connected to the thin film transistor T, is formed in the pixel region P.

The second substrate 30 includes a color filter layer 32 and a common electrode 34 formed on an inner surface of the upper substrate 30, which is the side facing the first substrate 10. First and second polarizers 52 and 54 are arranged over outer surfaces of the first and second substrates 10 and 30, respectively. Each of the first and second polarizers 52 and 54 may be a linear polarizer that transmits only linearly polarized light parallel to the light transmission axis of the polarizer. In addition, a backlight is disposed over the outer surface of the first polarizer 52 as a light source.

The LCD using the backlight as the light source is usually referred to as a transmissive LCD device. In the transmissive type, light incident from the backlight penetrates the liquid crystal panel, and the amount of the transmitted light is controlled according to the alignment of liquid crystal molecules. The amount of the transmitted light is very small for the amount of light incident from the backlight. Only 7% of the light incident from the backlight is transmitted through the liquid crystal panel. Accordingly, the brightness of the backlight should be increased to increase the brightness of the LCD device. Consequently, the transmissive LCD device has high power consumption due to the backlight. To provide enough power to the backlight, a battery is widely used. The battery is heavy, and provides limited operation time.

Transflective LCD devices, which can be used in both a transmissive mode and a reflective mode, have been recently introduced. Since a transflective LCD device uses light emitted from a backlight unit as well as natural or artificial ambient light, the transflective LCD device can be used under various lighting conditions, and has decreased power consumption. A transflective LCD device of the related art will be described hereinafter more in detail.

FIG. 2A is a plan view of an array substrate for the transflective LCD device according to related art. In FIG. 2A, a gate line 62 and a data line 70 cross each other, and a thin film transistor T is formed at a crossing of the gate line 62 and the data line 70. A crossing region of the gate line 62 and the data line 70 define a pixel region P. A pixel electrode 88 connected to the thin film transistor T is formed in each pixel region P. Although not shown in detail in the figure, the pixel electrode 88 includes a reflector, which has an opening 80 in the middle of the pixel region P, and a transparent electrode, which covers the reflector. The pixel electrode 88 overlaps the gate line 62 and the data line 70, and the transflective LCD device has a high aperture ratio.

Disclination occurs along edges of the pixel electrode 88 due to abnormal arrangement of liquid crystal molecules. Disinclination causes light leakage. In an LCD device including the above array substrate, since the pixel electrode 88 overlaps the gate and data lines 62 and 70 that are opaque, the gate and data lines 62 and 70 block light leakage around the edges of the pixel electrode 88. Additionally, the aperture ratio increases in accordance with the area of the pixel electrode 88. Thus, a reduction in contrast ratio due to light leakage is prevented in a high aperture ratio LCD device.

The overlap of the gate and data lines 62 and 70 by of the pixel electrode 88 causes a parasitic capacitance. The parasitic capacitance causes crosstalk. To minimize problems associated with crosstalk, an organic insulating material having relatively low dielectric constant is generally disposed between the gate and data lines 62 and 70 and the pixel electrode 88.

A portion of the pixel region P is referred to as a transmissive area TA. The transmissive area TA corresponds to the opening 80. The backlight is used as a light source within the transmissive area TA. The other portion surrounding the transmissive area TA is referred to as a reflective area RA. Ambient light is used as the light source within the reflective area RA.

FIG. 2B is a cross-sectional view of the related art transflective LCD device taken along the line IIB—IIB depicted in FIG. 2A The overlap of the pixel electrode and the gate and data lines will be explained in detail with reference to FIG. 2B. In FIG. 2B, a gate insulating layer 66 is formed on a substrate 60 and the data line 70 is formed the gate insulating layer 66. A first passivation layer 76 and a second passivation layer 78 sequentially formed covers the data line 70. Reflectors 82 are formed on the second passivation layer 78 such that adjacent reflectors 82 overlap respective sides of the data line 70. An inter insulating layer 84 is formed on the reflector 82. Transparent electrodes 86 are formed on the inter insulating layer 84. The transparent electrodes 86 correspond to the reflectors 82. One reflector 82 and a corresponding transparent electrode 86 constitute the pixel electrode 88.

In FIG. 2B, each of a first reflector 82 and a first transparent electrode 86 overlaps a first portion of the data line 70. The first reflector 82 and the first transparent electrode 86 are located on the left side of the data line 70, in the context of FIG. 2B. A second portion of the data line 70 is also overlapped by each of a second reflector 82 and a second transparent electrode 86. The second reflector 82 and the second transparent electrode 86 are located on right side of the data line 70, in the context of FIG. 2B. The second reflector 82 and the second transparent electrode 86 are adjacent to the first reflector 82 and the first transparent electrode 86, respectively. The first overlapped portion of the data line has a width d1. The second overlapped portion of the data line has a width d2. A distance between adjacent reflectors 82 or between adjacent transparent electrodes 86 is designated by d3.

As shown in FIG. 2A, when a rubbing direction r1 is defined as a diagonal direction from a lower-right side to an upper-left side, there are no rubbing problems because a rubbing fabric (not shown) travels from top to bottom in a right-stepping area A1 of the data line 70. However, in a left-stepping area A2 of the data line 70, since the rubbing fabric travels from bottom to top, rubbing may cause light leakage. To prevent light leakage, the width of the portion of the data line overlapped by the pixel electrode should be increased.

FIG. 3A illustrates an increase in the width of a transparent electrode in another array substrate for a transflective LCD device according to the related art. In FIG. 3A, a width of a transparent electrode 90 of the left side of data line 92 in the context of the figure is increased. Accordingly, the width of the left portion of the data line 92 that is overlapped by the left transparent electrode 90 also increases. Therefore, an overlap width d11 of the left portion of data line 90, which is overlapped by the left transparent electrode 90, is larger than an overlap width d12 of the right portion of data line 90, which is overlapped by of the right transparent electrode 94.

A distance d13 between the left and right adjacent transparent electrodes 90 and 94 decreases in accordance with the increase in the overlap width d11, in comparison with the array substrate depicted in FIG. 2B. If the distance d13 is very narrow, that is, if the distance between patterns, such as reflectors or transparent electrodes, is very narrow, forming the patterns by a photolithographic process is problematic due to the limited resolution of an exposing apparatus.

FIG. 3B illustrates an increase in a width of a data line in another array substrate for a transflective LCD device according to related art. In FIG. 3B, the data line 96 is extended to the left. Accordingly, the width of the left portion of the data line 96 that is overlapped by the left transparent electrode 98 also increases. However, the pixel area is deacreased by the above method, thus reducing the aperture ratio.

Therefore, in the related art transflective LCD device with a high aperture ratio, it is difficult to sufficiently increase the width of an overlapped portion of the gate and data lines by the pixel electrode due to processing limitation from an exposing apparatus. In addition, the aperture ratio decreases when the width of the overlapped portion increases.

SUMMARY OF THE INVENTION

Accordingly, the present invention is directed to an array substrate and a transflective liquid crystal display device including the same that substantially obviates one or more problems due to limitations and disadvantages of the related art.

An object of the present invention is to provide an array substrate for a transflective liquid crystal display device that has a high aperture ratio.

Another object of the present invention is to provide a transflective liquid crystal display device that has a high aperture ratio.

Another object of the present invention is to provide an array substrate that blocks light leakage without reducing an aperture ratio of a transflective liquid crystal display device.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, the array substrate for a transflective liquid crystal display device includes a plurality of gate lines and a plurality of data lines disposed on a substrate and crossing each other to define a plurality of pixel regions, a thin film transistor adjacent to each crossing of the gate and data lines, a passivation layer covering the thin film transistor, a reflector in each pixel region and having an opening, the reflector overlapping the gate and data lines with an overlap width, and a transparent electrode in each pixel region and shifted in a first direction with respect to the reflector.

In another aspect of the present invention, a transflective liquid crystal display device includes a plurality of gate lines and a plurality of data lines disposed on a first substrate and crossing each other to define a plurality of pixel regions, a thin film transistor adjacent to each crossing of the gate and data lines, a passivation layer covering the thin film transistor, a reflector in each pixel region and having an opening, the reflector overlapping the gate and data lines with an overlap width, a transparent electrode in each pixel region and shifted in a first direction with respect to the reflector, a second substrate facing the first substrate, and a liquid crystal layer interposed between the first and second substrates.

In another aspect, the transflective liquid crystal display device includes a first substrate and a second substrate, a data line disposed on the first substrate, a first passivation layer covering an entire surface of the first substrate including the data line, a second passivation layer over a portion of the first passivation layer and covering the data line, the second passivation layer having a first opening, a plurality of reflectors covering a left side and a right side of the data line. The reflectors overlap the data line by a left overlap width and a right overlap width. One of the reflectors provides a second opening that corresponds to the first opening. The transflective liquid crystal display device further includes an inter insulating layer covering the entire surface of the first substrate including the plurality of reflectors, a plurality of transparent electrodes formed on the inter insulating layer and shifted in a first direction with respect to the reflectors, and a liquid crystal layer interposed between the first and second substrates. The first and second passivation layers, the inter insulating layer, the reflectors and the transparent electrodes include respective overlapping slanted left portions and right portions.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
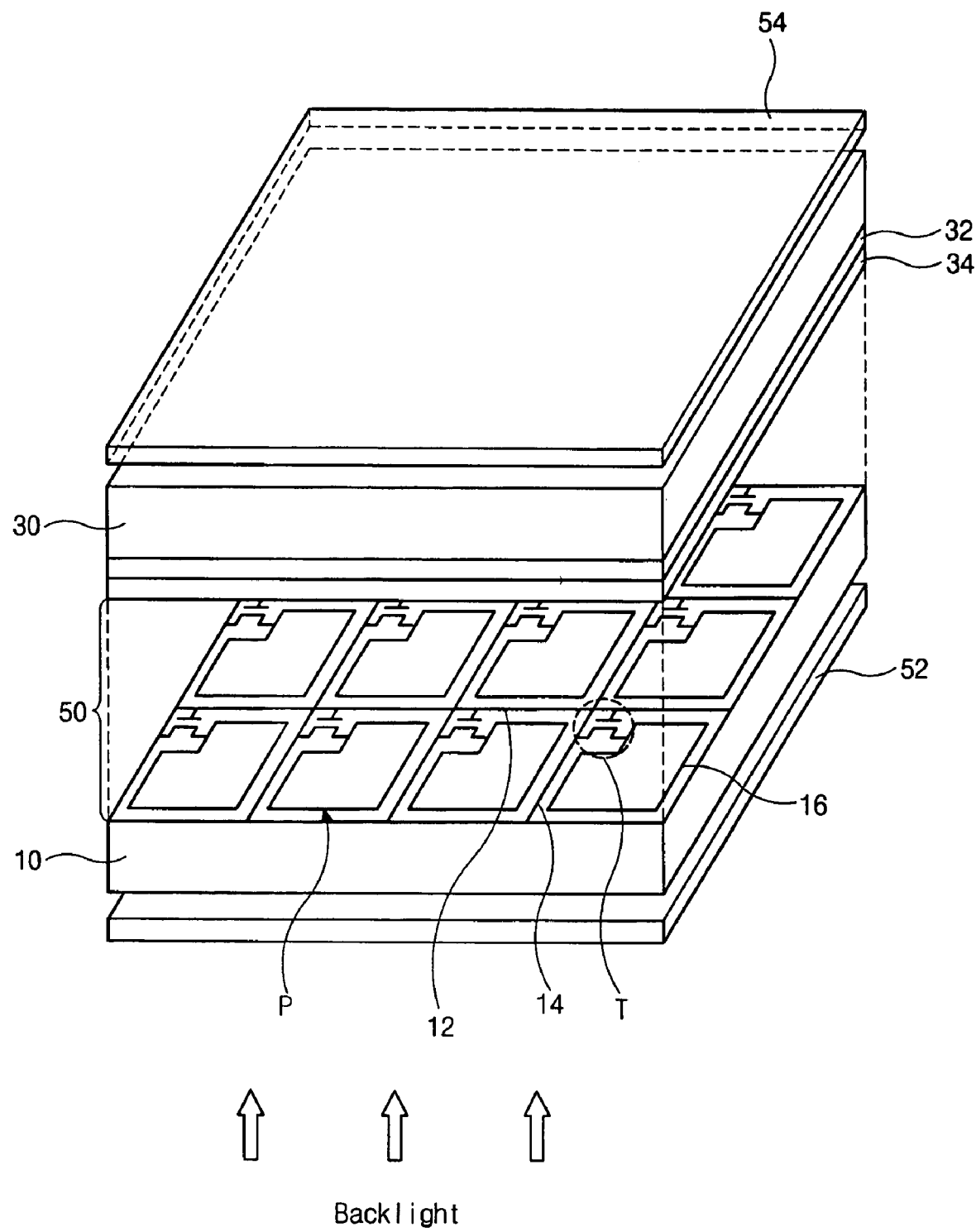
FIG. 1 is a schematic view of a LCD device according to the related art.
Figure 2A:
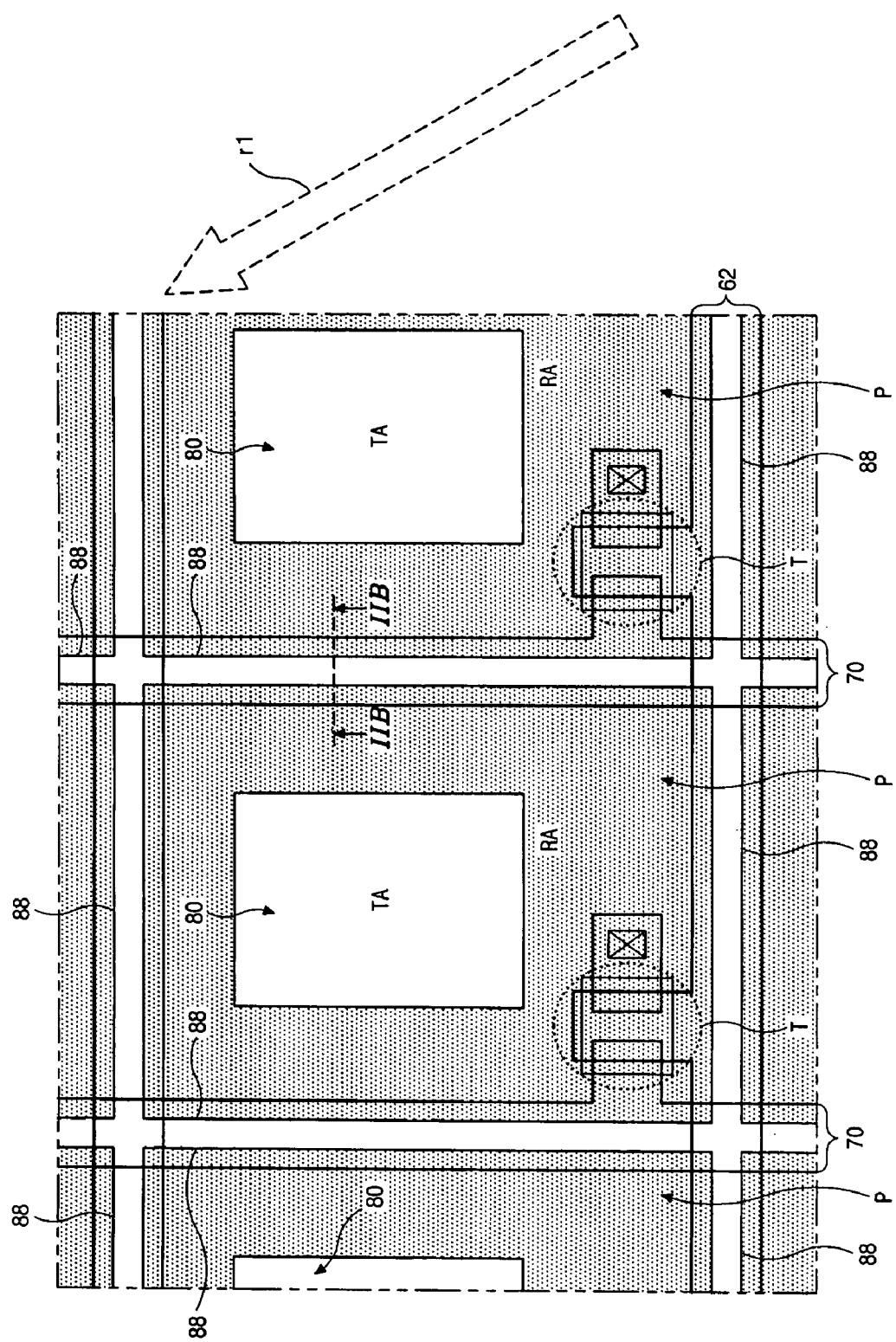
FIG. 2A is a plan view of an array substrate for the transflective LCD device according to the related art.
Figure 2B:
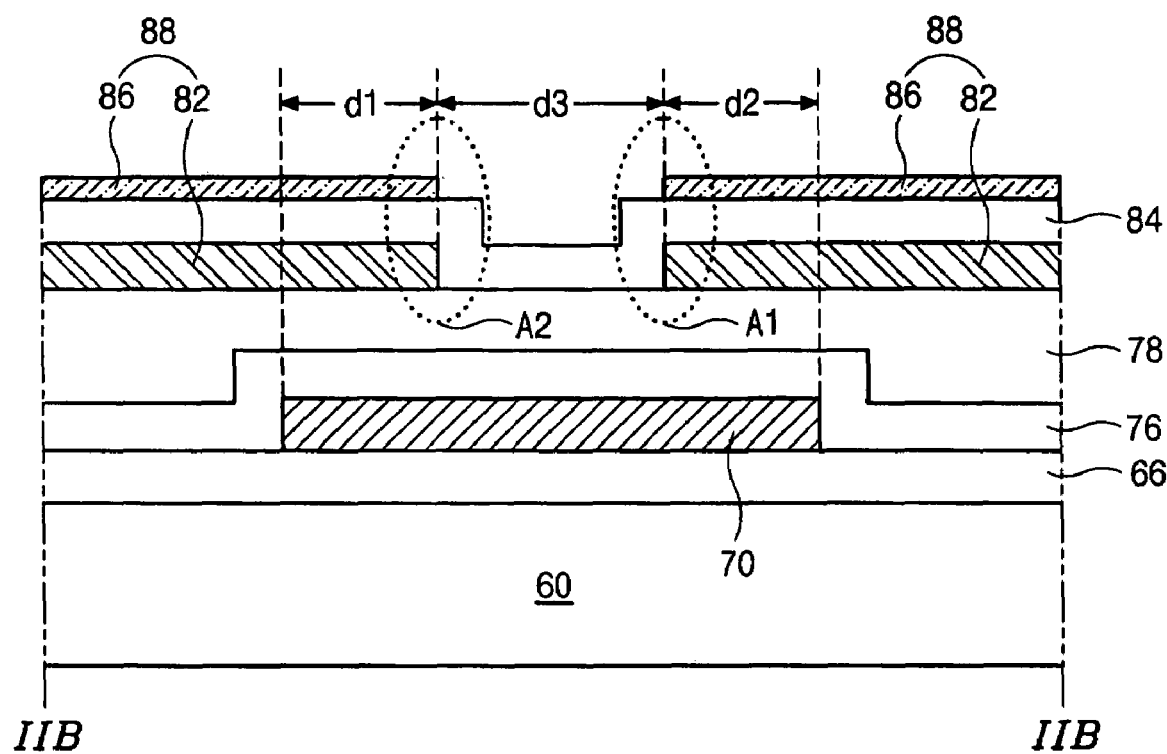
FIG. 2B is a cross-sectional view of the related art transflective LCD device taken along line IIB—IIB depicted in FIG. 2A.
Figure 3A:
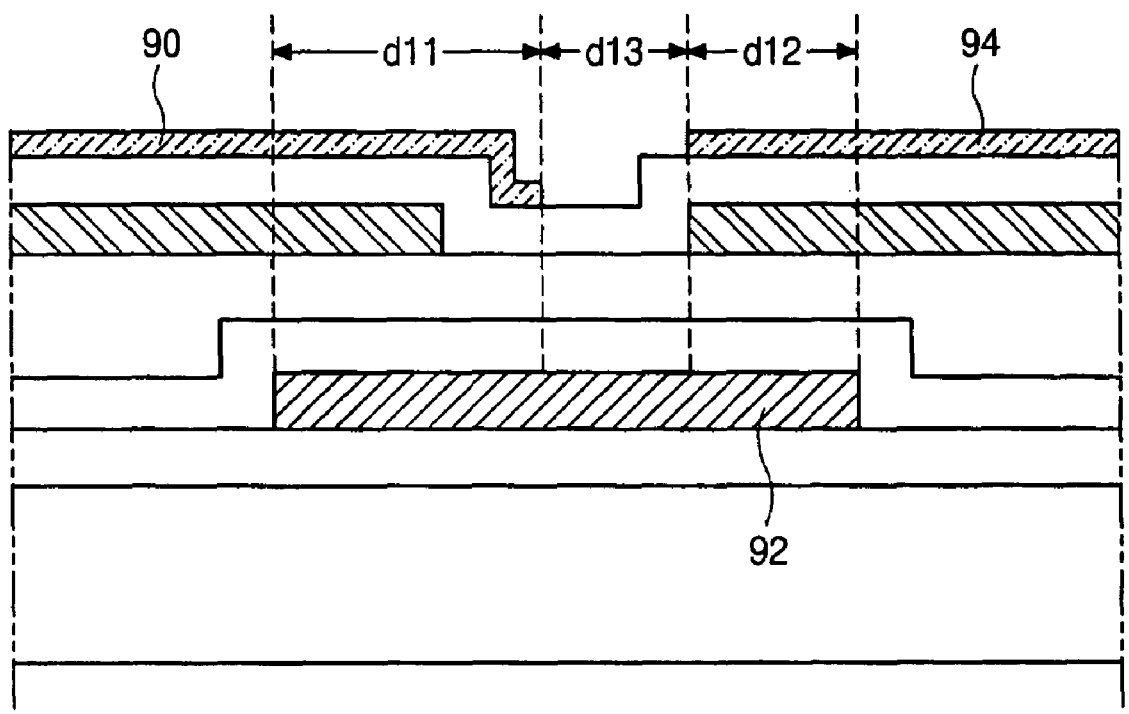
FIG. 3A illustrates an increase in the width of a transparent electrode in another array substrate for a transflective LCD device according to the related art.
Figure 3B:
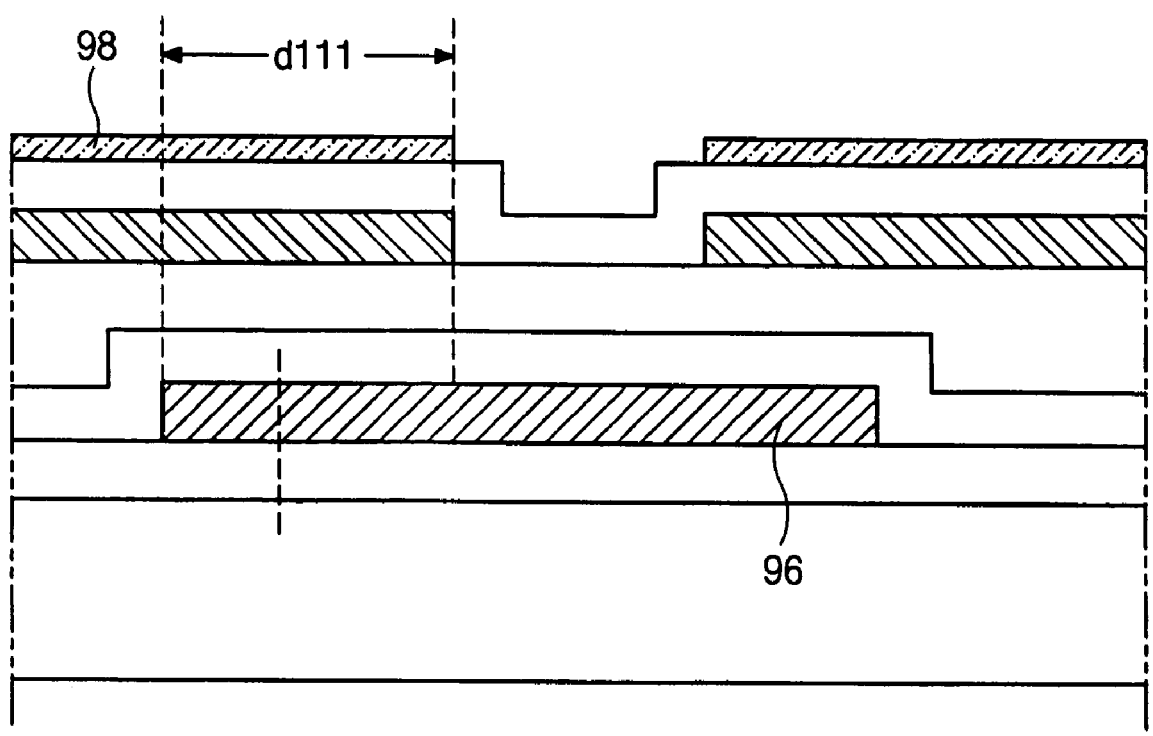
FIG. 3B illustrates an increase in a width of a data line in another array substrate for a transflective LCD device according to the related art.
Figure 4A:
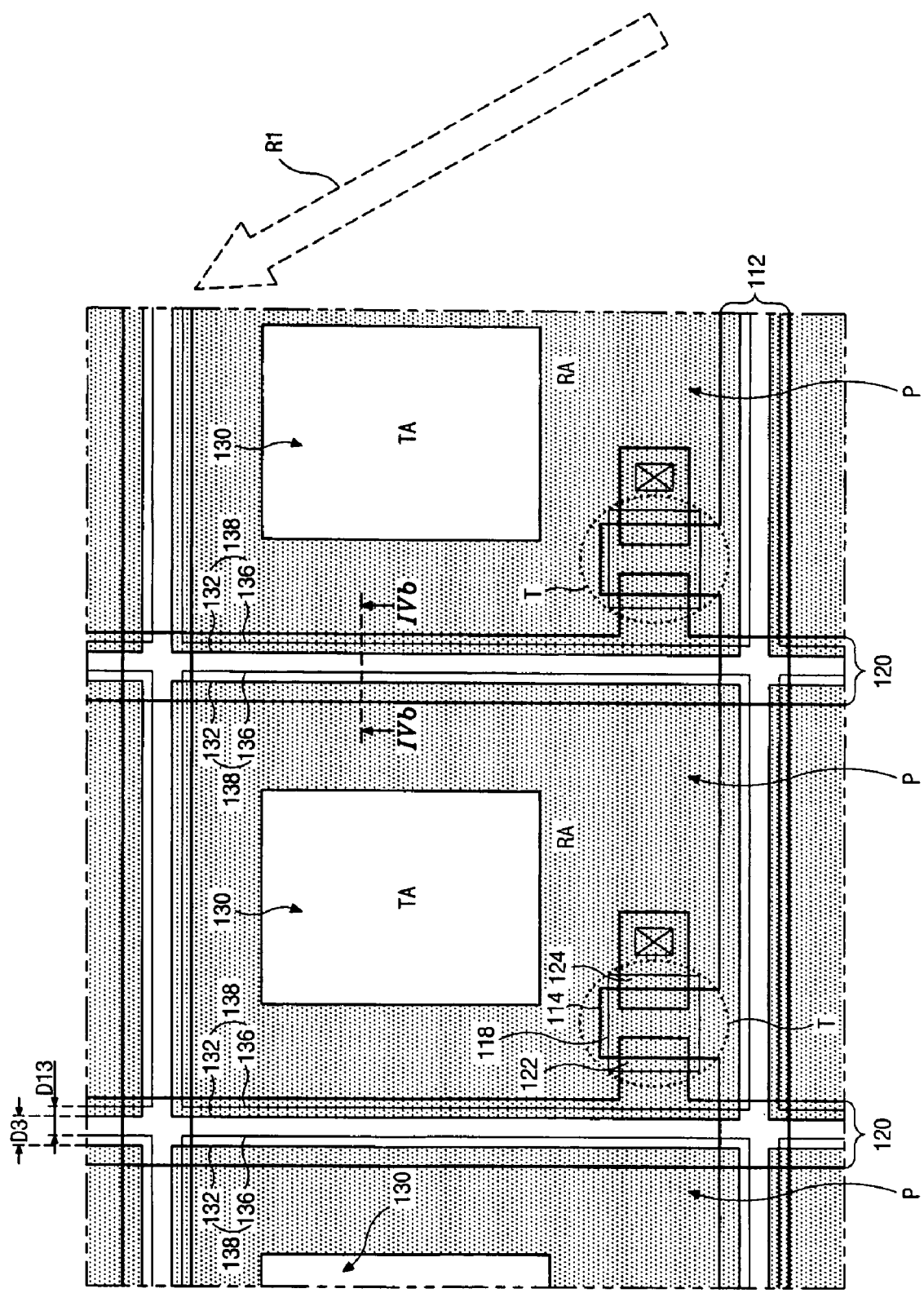
FIG. 4A is a planar view of an exemplary array substrate for a transflective liquid crystal display (LCD) device according to a first embodiment of the present invention.

FIG. 4A is a planar view of an exemplary array substrate for a transflective liquid crystal display (LCD) device according to a first embodiment of the present invention. In FIG. 4A, a gate line 112 is formed in a first direction and a data line 120 is formed in a second direction crossing the first direction. A thin film transistor T is formed adjacent to a crossing of the gate line 112 and the data line 120. A crossing region of the gate line 112 and the data line 120 define a pixel region P. A pixel electrode 138 connected to the thin film transistor T is formed in each pixel region P. The pixel electrode 138 overlaps the gate line 112 and the data line 120. Thus, the transflective LCD device has a high aperture ratio.

The pixel electrode 138 includes a reflector 132 and a transparent electrode 136. The reflector 132 has an opening 130 in the middle of the pixel region P. The transparent electrode 136 is connected to the thin film transistor T and covers the reflector 132. When an alignment direction R1 is defined as a diagonal direction from a lower-right side to an upper-left side, the transparent electrode 136 is shifted to the right with respect to the reflector 132. Adjacent reflectors 132 are substantially completely symmetrical to each other with respect to the data line 120 and adjacent transparent electrodes 136 are asymmetrical to the data line 120. The alignment direction R1 may be a rubbing direction of an alignment layer (not shown). A distance D3 between adjacent reflectors 132 is equal to a distance D13 between adjacent transparent electrodes 136.

In the pixel region P, a portion corresponding to the opening 130 is referred to as a transmissive area TA. The backlight is used as a light source in the transmissive area TA. The other portion surrounding the transmissive area TA is referred to as a reflective area RA. Ambient light is used as the light source in the reflective area RA.

The thin film transistor T includes a gate electrode 114 that is extended from the gate line 112. A source electrode 122 is extended from the data line 120 in the thion film transistor T. A drain electrode 124 of the thin film transistor is spaced apart from the source electrode 122. The thin film transistor further includes a semiconductor layer 118 that is formed of amorphous silicon. The thin film transistor T may be of an inverted staggered type, in which the gate electrode 114 is disposed in the bottom and the semiconductor layer 118 between the source and drain electrodes 122 and 124 becomes a channel of the thin film transistor T.

In this embodiment of the present invention, the pixel electrode 138 covers the thin film transistor T. Thus, photo leakage currents in the channel are prevented. Moreover, a black matrix corresponding to the thin film transistor T may be omitted.

Figure 4B:
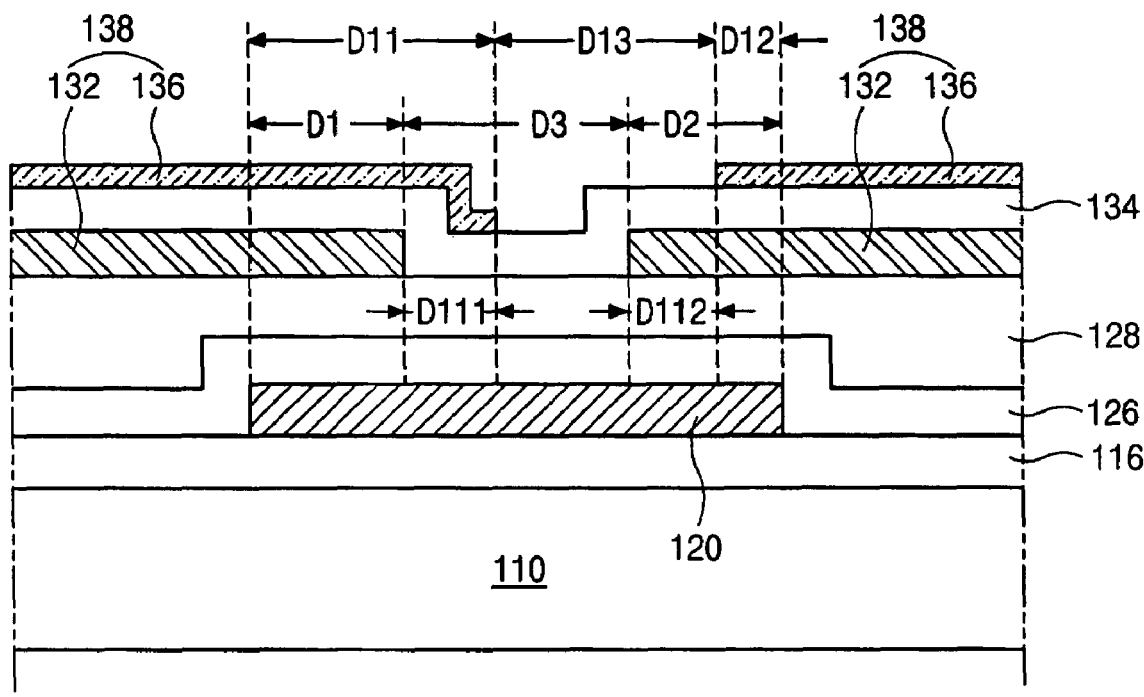
FIG. 4B is a cross-sectional view along the line IVb—IVb of FIG. 4A of the exemplary array substrate for the transflective liquid crystal display (LCD) device according to the first embodiment of the present invention.

FIG. 4B is a cross-sectional view along the line IVb—IVb of FIG. 4A of the exemplary array substrate for the transflective liquid crystal display (LCD) device according to the first embodiment of the present invention. In FIG. 4B, a gate insulating layer 116 is formed on a substrate 110 and the data line 120 is formed the gate insulating layer 116. A first passivation layer 126 made of an inorganic material covers the data line 120. A second passivation layer 128 made of an organic material is formed on the first passivation layer 126. The organic material from the second passivation layer has low dielectric constant. Reflectors 132 are formed on the second passivation layer 128 such that the reflectors 132 overlap respective sides of the data line 120. As mentioned above, the reflectors 132 are substantially completely symmetric to each other with respect to the data line 120. The reflectors 132 may be formed of a metal material with high reflectivity. Aluminum (Al) and Silver (Ag) are examples of high reflectivity metals that can be used for forming the reflector.

A width of the portion of the data line 120 overlapped by the reflector 132 in the left side in the context of the figure is referred to as the overlap width D1. A width of the portion of the data line 120 overlapped by the reflector 123 in the right side in the context of the figure is referred to as the overlap width D2. A distance between adjacent reflectors 132 is designated by D3. The overlap widths D1 and D2 have the same value.

An inter insulating layer 134 is formed on the reflectors 132. Transparent electrodes 136 are formed on the inter insulating layer 134. A distance D13 between adjacent transparent electrodes 136 is equal to the distance D3 between adjacent reflectors 132. The transparent electrodes 136 do not coincide with the reflectors 132. The transparent electrodes 136 may be made of a transparent conductive material such as indium-tin-oxide (ITO) and indium-zinc-oxide (IZO). As stated above, the reflector 132 and the transparent electrode 136 constitute a pixel electrode 138. The inter insulating layer 134 may have a thickness such that the reflector 132 has the same potential as the transparent electrode 136.

As mentioned above, when the rubbing direction R1 is defined as a diagonal direction from a lower-right side to an upper-left side, an overlap width of the data line 120 and the transparent electrode 136 in the left side in the context of the figure is designated by D11 and an overlap width of the data line 120 and the transparent electrode 136 in the right side in the context of the figure is designated by D12, wherein D1 is wider than D12.

In FIG. 4B, D111 designates a shift of the transparent electrode 136 located on the left side in the context of the figure. Similarly, D112 designates a shift of the transparent electrode 136 located on the right side in the context of the figure. The transparent electrodes 136 are shifted to the right with respect to the reflectors 132 in the context of the figure. The shifts D111 and D112 have the same value.

In this embodiment of the present invention, the distance D3 between the adjacent reflectors 132 is equal to the distance D13 between adjacent transparent electrodes 136. The transparent electrodes 136 are shifted with respect to the reflectors 132 by a predetermined distance to cover a portion poorly rubbed depending on the rubbing direction R1. The symmetrically disposed reflectors 132 have uniform overlap widths with the data line 120.

A portion of the transparent electrode 136 near the data line 120 corresponds to the reflective area RA of FIG. 4A. In this embodiment of the present invention, an area ratio of the reflective area RA and the transmissive area TA does not change because the transparent electrode 136 is shifted by a predetermined distance so as not to coincide with the reflector 132. The distances D3 and D13 may have a minimum value of about 5 µm, and the shift D111 may have a maximum value of about 5 µm.

Figure 5:
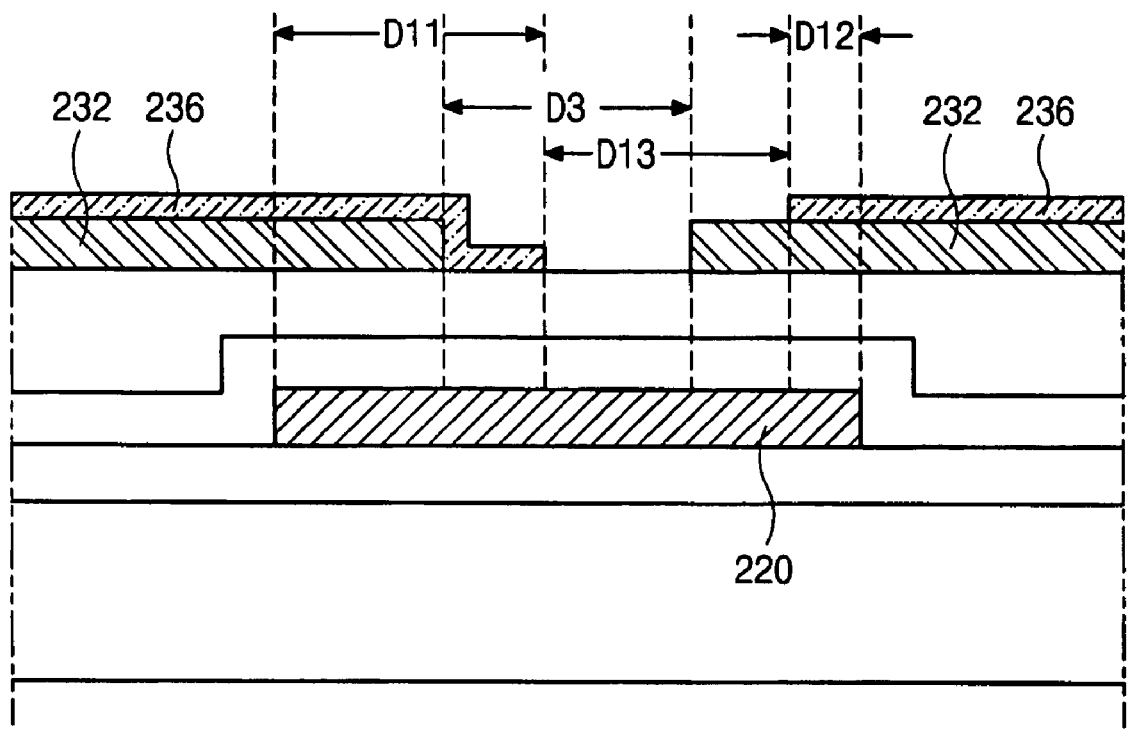
FIG. 5 is a cross-sectional view of an exemplary array substrate for a transflective LCD device according to a second embodiment of the present invention.

FIG. 5 is a cross-sectional view of an exemplary array substrate for a transflective LCD device according to a second embodiment of the present invention. FIG. 5 mainly shows a part including a data line. Explanations associated with corresponding parts from FIG. 4B will be omitted. In this embodiment of the present invention, the reflectors 232 and the transparent electrodes 236 do not coincide. The transparent electrodes 236 is shifted to the right in the context of the figure with respect to the reflectors 232. An inter insulating layer is omitted between the reflectors 232 and the transparent electrodes 236. Thus, the reflectors 232 directly contact the transparent electrodes 236. The reflectors 232 constitute reflective electrodes.

The adjacent reflectors 232 are symmetrical to each other with respect to the data line 220. The transparent electrode 236 on the left side in the context of the figure overlaps a portion of the data line 220 by an overlap width D11. The transparent electrode 236 on the right side in the context of the figure overlaps a portion of the data line 220 by an overlap width D12. The overlap width D11 is wider than an overlap width D12. Here, a distance D3 between adjacent reflectors 232 and a distance D13 between adjacent transparent electrodes 236 are equal. A rubbing direction of the second embodiment of the present invention is the same as the rubbing direction R1 of FIG. 4A of the first embodiment. In contrast, if the rubbing is performed in a direction opposite to the rubbing direction R1 of FIG. 4A, the overlap width D12 may be wider than the overlap width D11.

Figure 6:
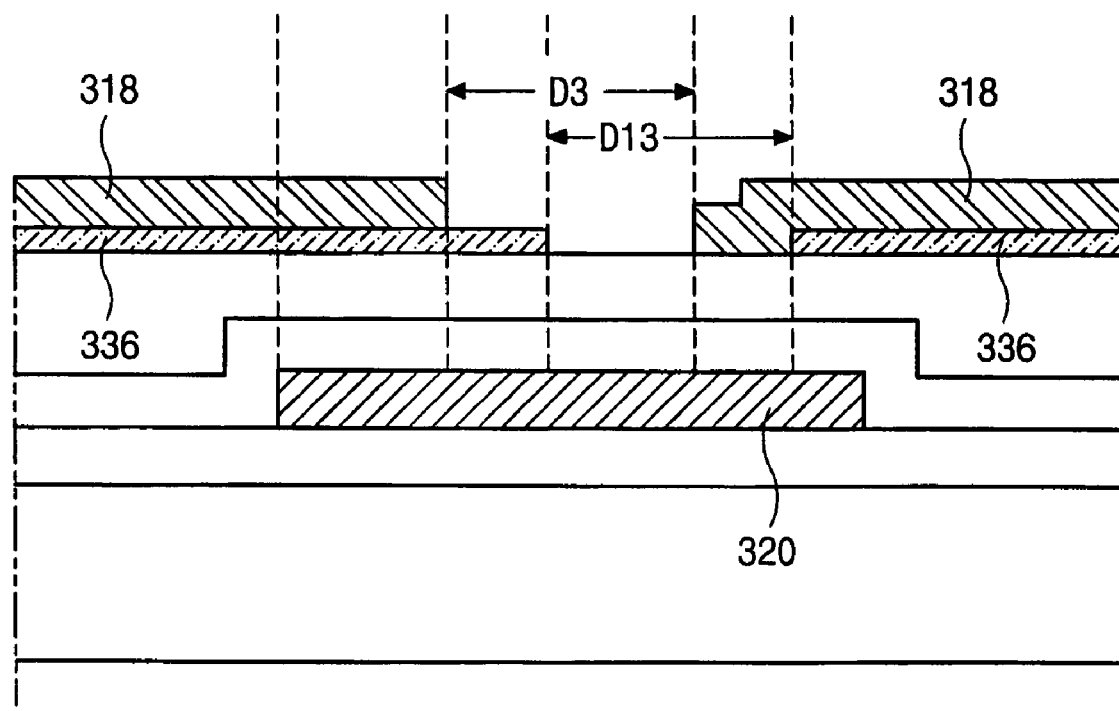
FIG. 6 is a cross-sectional view of an exemplary array substrate for a transflective LCD device according to a third embodiment of the present invention.

FIG. 6 is a cross-sectional view of an exemplary array substrate for a transflective LCD device according to a third embodiment of the present invention. FIG. 6 mainly shows a part including a data line and explanations associated with corresponding parts of FIG. 5 will be omitted. In this embodiment of the present invention, an inter insulating layer between reflectors 318 and transparent electrodes 336 is omitted. The transparent electrodes 336 is disposed under the reflectors 318. The reflectors 318 are disposed over and in direct contact with the transparent electrodes 336.

A portion of a pixel region near a data line 320 corresponds to a reflective area. Adjacent reflectors 318 are disposed symmetrically with respect to the data line 320. A distance D3 between adjacent reflectors 318 is equal to a distance D13 between adjacent transparent electrodes 336. The transparent electrodes 336 are shifted to the right in the context of the figure with respect to the reflectors 318 by a width less than or equal to the distance D3. Thus, the transparent electrodes 336 do not coincide with the reflectors 318.

Figure 7:
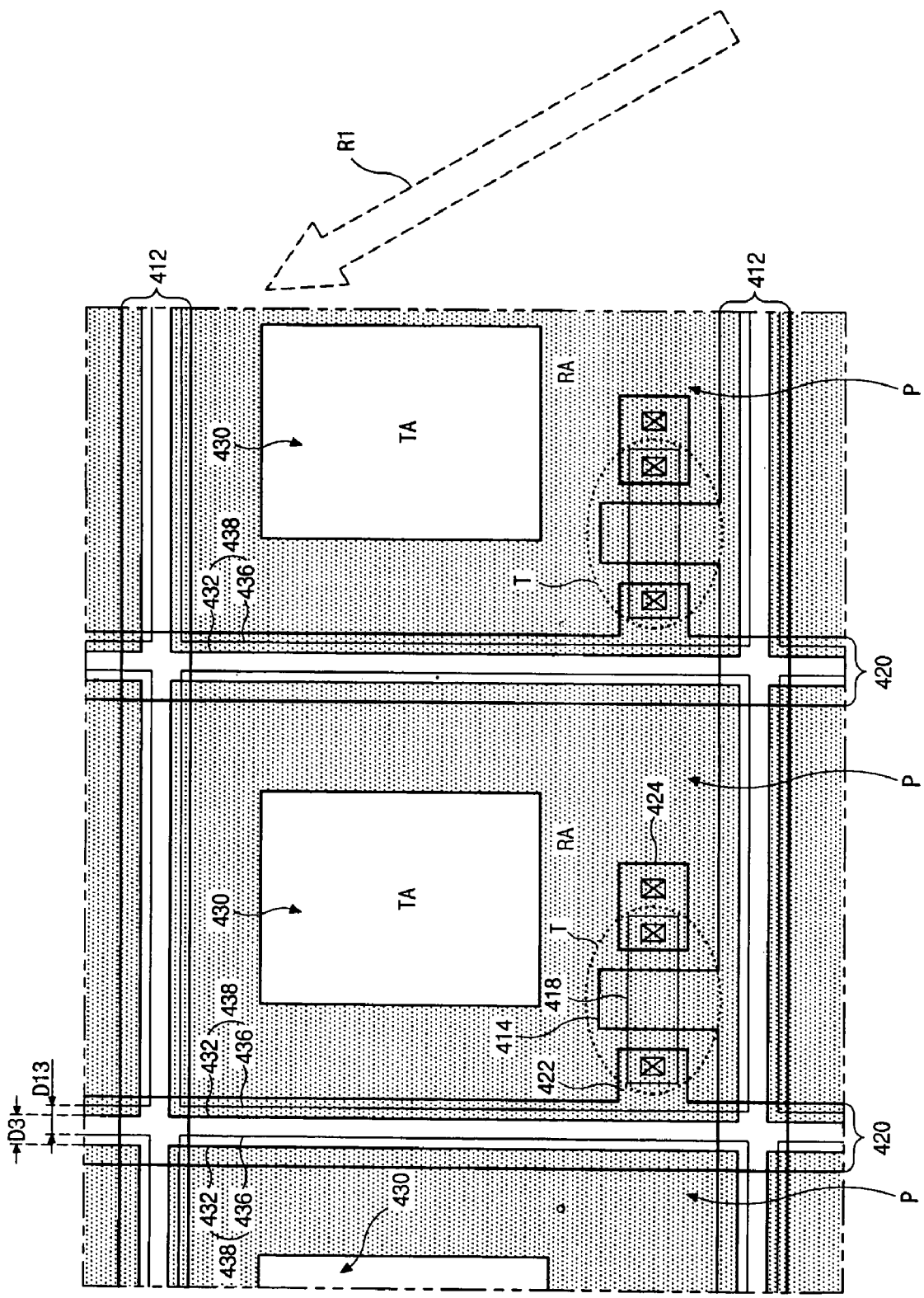
FIG. 7 is a plan view of an exemplary array substrate for a transflective LCD device according to a fourth embodiment of the present invention.

FIG. 7 is a plan view of an exemplary array substrate for a transflective LCD device according to a fourth embodiment of the present invention. Explanation associated with corresponding parts from FIG. 4A will be omitted. The array substrate of FIG. 7 includes a polysilicon thin film transistor. As shown in FIG. 7, a gate line 412 and a data line 420 cross each other. A thin film transistor T is formed adjacent to a crossing of the gate line 412 and the data line 420. A crossing region of the gate line 412 and the data line 420 define a pixel region P. A pixel electrode 438 is formed in each pixel region P. The pixel electrode is connected to the thin film transistor T.

The thin film transistor T includes a semiconductor layer 418 that is made of polycrystalline silicon. A gate electrode 414 of the thin film transistor T overlaps the semiconductor layer 418 and is extended from the gate line 412. A source electrode 422 of the thin film transistor is extended from the data line 420 and is connected to one side of the semiconductor layer 418. A drain electrode 424 of the thin film transistor is spaced apart from the source electrode 422 and is connected to the other side of the semiconductor layer 418. The pixel electrode 438 is connected to the drain electrode 424 of the thin film transistor T.

In this embodiment of the present invention, the thin film transistor T has a top-gate structure. In the top-gate structure, the semiconductor layer 418 is disposed at the bottom. Moreover, the gate electrode 414 is disposed over the semiconductor layer 418.

The pixel electrode 438 includes a reflector 432 and a transparent electrode 436. The reflector 432 has an opening 430 in the middle of the pixel region P. The transparent electrode 436 is connected to the thin film transistor T and covers the reflector 432. A distance D3 between the adjacent reflectors 132 is equal to a distance D13 between the adjacent transparent electrodes 136. The transparent electrode 136 is shifted to the right with respect to the reflector 132 in the context of the figure. When a rubbing direction R1 is defined as a diagonal direction from a lower-right side to an upper-left side, adjacent reflectors 432 are symmetrical to each other with respect to the data line 420. Transparent electrodes 436 are shifted to the right in the context of the figure with respect to the reflectors 432. Thus, a poorly rubbed portion is effectively screened to prevent light leakage.

In the pixel region P, a portion corresponding to the opening 430 is referred to as a transmissive area TA. The backlight is used as a light source in the transmissive area. The other portion surrounding the transmissive area TA is referred to as a reflective area RA. Ambient light is used as the light source in the reflective area. Although not shown in the figure, a buffer layer, a gate insulating layer and an inter insulating layer may be sequentially formed under the data line 420.

Figure 8:
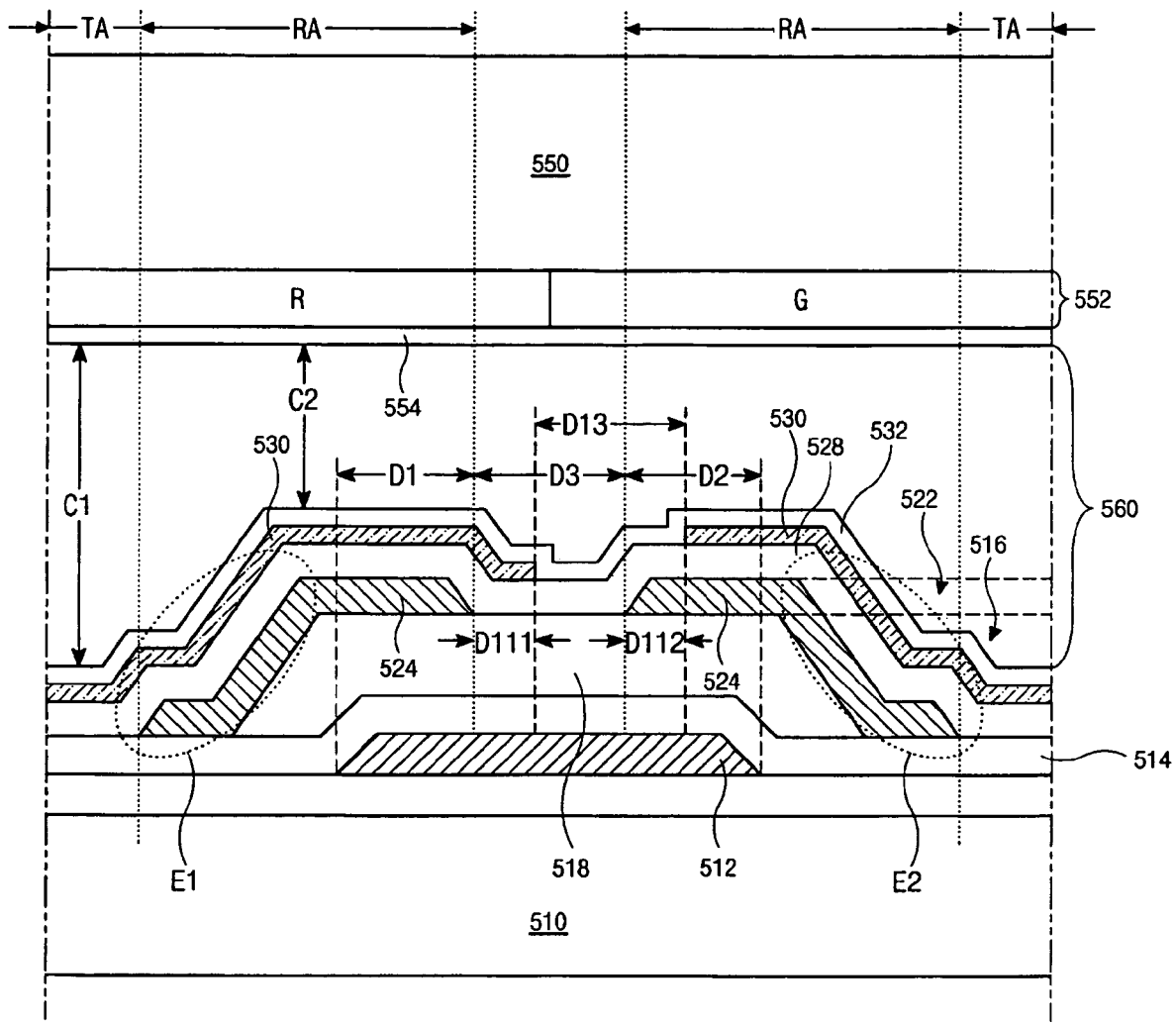
FIG. 8 is a cross-sectional view of an exemplary transflective LCD device according to a fifth embodiment of the present invention.

FIG. 8 is a cross-sectional view of an exemplary transflective LCD device according to a fifth embodiment of the present invention. In FIG. 8, first and second substrates 510 and 550 are spaced apart from and face each other. A data line 512 is formed on an inner surface of the first substrate 510. A first passivation layer 514 is formed on an entire surface of the first substrate 510 including the data line 512. The first passivation layer 514 is made of an inorganic material. A second passivation layer 518 is formed on the first passivation layer 514. The second passivation layer covers the data line 512 and has a first opening 516.

Reflectors 524 are formed on the second passivation layer 518. The reflectors 524 cover both sides of the data line 512, respectively. Each reflector 524 has a second opening 522 corresponding to the first opening 516. A portion where the data line 512 is overlapped by the reflector 524 on the left side in the context of the figure is referred to as overlap width D1. A portion where the data line 512 is overlapped by the reflector 524 on the right side in the context of the figure is referred to as overlap width D2. A distance between the adjacent reflectors 524 is designated by D3.

An inter insulating layer 528 is formed on an entire surface of the first substrate 510 including the reflectors 524. Transparent electrodes 530 are formed on the inter insulating layer 528. The transparent electrodes 530 are spaced apart from each other by a distance D13 corresponding to the distance D3 and shifted to the right in the context of the figure respect to the reflectors 524 by distances D111 and D112, respectively. The distances D111 and D112 are equal to each other.

In this embodiment of the present invention, the rubbing direction is from right to left in the context of the figure. In contrast, if the rubbing direction is from left to right in the context of the figure, the transparent electrodes 530 may be shifted to the left in the context of the figure with respect to the reflectors 524. The shift distance D111 or D112 of the transparent electrodes 530 may be selected to be a value less than or equal to the distance D3 between the adjacent reflectors 524.

A first alignment layer 532 is formed on an entire surface of the substrate 510 including the transparent electrodes 530. A color filter layer 552 is formed on an inner surface of the second substrate 550. The color filter layer 552 may include three sub-color filters of respective colors red (R), green (G) and blue (B). Two sub-color filter regions of red and green colors are shown in FIG. 8. A second alignment layer 554 is formed under the color filter layer 552. Although not shown in the figure, a common electrode is formed between the color filter layer 552 and the second alignment layer 554. A liquid crystal layer 560 is interposed between the first and second alignment layers 532 and 554.

A thickness of the liquid crystal layer 560 is defined as a cell gap of the LCD device. A portion corresponding to the second opening 522 is referred to as a transmissive area TA. A portion corresponding to the reflectors 54 is referred to as a reflective area RA. A cell gap C1 of the transmissive area TA is twice a cell gap C2 of the reflective area RA. This relation between the cell gaps optimizes the transmittance of a transmissive mode with regard to the transmittance or optical efficiency of a reflective mode. Accordingly, the brightness and color properties in the transmissive mode and the reflective mode may be made uniform.

A border portion between the transmissive area TA and the reflective area RA has a slant. The arrangement of liquid crystal molecules is distorted in the border portion causing light leakage in the transmissive mode. The reflectors 524 in portions E1 and E2 of FIG. 8 do not increase the reflectance in the reflective mode but prevent light leakage in the transmissive mode due to the distorted arrangement of the liquid crystal molecules in the border portion.

Although the reflectors 524 are not electrically connected to the transparent electrodes 530, the reflectors 524 have substantially the same potential as the transparent electrodes 530. Storage capacitors may be formed between the reflectors 524 and the data line 512. Thus, the reflectors 524 in the portions E1 and E2 should be spaced apart from the data line 512 by a distance appropriate to prevent formation of the storage capacitors.

The capacitance of the storage capacitors increases when the distance between the reflectors 524 and the data line 512 decreases. The increase in the capacitance of the storage capacitors causes problems like capacitive coupling which lower image quality. To solve these problems, the distance between the reflectors 524 and the data line 512 is preferably set to 1.5 µm or larger.

If a width of the data line is increased to prevent another form of light leakage due to insufficient overlap between the data line and the pixel electrode, a portion of the reflector used to eliminate the light leakage in the inclined area may be included in the transmissive area. As a result, an expected transmittance in the transmissive mode cannot be obtained. Thus, increasing the width of the data line to prevent light leakage due to insufficient overlap between the data line and the pixel electrode may not be appropriate.

For example, in a 4 inch video graphics adapter (VGA), which has a resolution of 200 pixel per inch (200 ppi), when a distance between adjacent pixel electrodes has a minimum value of about 5 µm and a maximum shift of the transparent electrode is about 5 µm, an aperture ratio in the transmissive area is about 28.3%. Then, if a width of the data line is increased by 5 µm without shifting the transparent electrode, the aperture ratio is about 22.7%. The difference between the aperture ratios is about 5.6%, and this corresponds to a brightness variation of about 20% in the transmissive mode.

The transmissive area is disposed in the center of the pixel region in embodiments of the present invention. However, the transmissive area and the reflective area may be disposed according to other arrangements.

In the present invention, adjacent reflectors overlap the data line symmetrically and adjacent transparent electrodes overlap the data line while shifted with respect to the reflectors according to a rubbing direction. Since the distance between adjacent pixel electrodes is uniformly maintained while overlap rates are increased in a desired area, light leakage is effectively blocked without lowering the aperture ratio. In addition, edges of the pixel electrode and the channel of the thin film transistor are blocked by the reflector, which is made of an opaque metal material. Thus, manufacturing processes are decreased because an additional portion of the black matrix may be omitted.

It will be apparent to those skilled in the art that various modifications and variations can be made in the array substrate, and transflective liquid crystal display device including the same, of the present invention without departing from the spirit or scope of the invention. Thus, it is intended that the present invention cover the modifications and variations of this invention provided they come within the scope of the appended claims and their equivalents.

What is claimed is:

1. An array substrate for a transflective liquid crystal display device, comprising:
   a plurality of gate lines and a plurality of data lines disposed on a substrate and crossing each other to define a plurality of pixel regions;
   a plurality of thin film transistors that are each adjacent to a respective crossing of the gate and data lines;
   a passivation layer covering the plurality of thin film transistors;
   a plurality of reflectors each in a respective pixel region and having an opening, each reflector overlapping respective gate and data lines with an overlap width; and
   a plurality of transparent electrodes each in a respective pixel region, such that a portion of one transparent electrode over at least one of gate line and data line extends beyond a corresponding reflector, and a portion of an adjacent reflector over the at least one of the gate line and the data line extends beyond a corresponding transparent electrode, wherein the one transparent electrode and the adjacent reflector define a shift width of the transparent electrode with respect to the at least one of the data line and the gate line, and is less than or equal to the distance between adjacent reflectors.

2. The array substrate according to claim 1, wherein a distance between adjacent reflectors is substantially equal to a distance between adjacent transparent electrodes.

3. The array substrate according to claim 1, wherein a portion corresponding to each opening is a transmissive area and a portion corresponding to each reflector is a reflective area.

4. The array substrate according to claim 1, wherein the passivation layer includes a first insulating layer of an inorganic material and a second insulating layer of an organic material.

5. The array substrate according to claim 1, wherein the each reflector is disposed under a corresponding transparent electrode.

6. The array substrate according to claim 5, further comprising an inter insulating layer interposed between the reflectors and the pixel electrodes.

7. The array substrate according to claim 6, wherein the reflectors and the pixel electrodes have the same electric potential.

8. The array substrate according to claim 1, wherein each reflector directly contacts a corresponding transparent electrode.

9. The array substrate according to claim 8, wherein each reflector is disposed under a corresponding transparent electrode.

10. The array substrate according to claim 8, wherein each reflector is disposed over a corresponding transparent electrode.

11. The array substrate according to claim 1, wherein each thin film transistor includes a gate electrode, a semiconductor layer of amorphous silicon, a source electrode and a drain electrode.

12. The array substrate according to claim 1, wherein each thin film transistor includes a gate electrode, a semiconductor layer of polycrystalline silicon, a source electrode and a drain electrode.

13. The array substrate according to claim 1, wherein each reflector includes one of aluminum (Al) and silver (Ag).

14. The array substrate according to claim 1, wherein each transparent electrode includes a transparent conductive material.

15. The array substrate according to claim 14, wherein the transparent conductive material includes one of indium tin oxide (ITO) and indium zinc oxide (IZO).

16. The array substrate according to claim 1, wherein one reflector and one transparent electrode form a pixel electrode.

17. A transflective liquid crystal display device, comprising:
   a plurality of gate lines and a plurality of data lines disposed on a first substrate and crossing each other to define a plurality of pixel regions;
   a plurality of thin film transistors that are each adjacent to respective crossing of the gate and data lines;
   a passivation layer covering the plurality of thin film transistors;
   a plurality of reflectors each in a respective pixel region and having an opening, each reflector overlapping respective gate and data lines with an overlap width;
   a plurality of transparent electrodes each in a respective pixel region, such that a portion of one transparent electrode over at least one of gate line and data line extends beyond a corresponding reflector, and a portion of an adjacent reflector over the at least one of the gate line and the data line extends beyond a corresponding transparent electrode, wherein the one transparent electrode and the adjacent reflector define a shift width of the transparent electrode with respect to the at least one of the data line and the gate line, and is less than or equal to the distance between adjacent reflectors;
   a second substrate facing the first substrate; and
   a liquid crystal layer interposed between the first and second substrates.

18. The device according to claim 17, wherein a distance between adjacent reflectors is equal to a distance between adjacent transparent electrodes.

19. The device according to claim 17, further comprising first and second alignment layers on inner surfaces of the first and second substrates, respectively, and contacting the liquid crystal layer.

20. The device according to claim 19, wherein a first direction is determined by an alignment direction of the first and second alignment layers.

21. The device according to claim 20, wherein the alignment direction and the first direction make an angle of about 135 degrees.

22. The device according to claim 21, wherein the alignment direction has an angle of about +135 degrees with respect to the gate line.

23. The device according to claim 22, wherein two adjacent transparent electrodes overlap at least one of the gate line and data line to define first and second overlap widths, respectively, the first overlap width is narrower than the second overlap width, and a portion of one of the two adjacent transparent electrodes includes a first rubbing contact portion with a rubbing fabric.

24. The device according to claim 17, wherein one reflector and one transparent electrode form a pixel electrode.

25. The device according to claim 17, wherein a portion corresponding to each opening includes a transmissive area, and a portion corresponding to each reflector includes a reflective area.

26. The device according to claim 25, wherein a thickness of the liquid crystal layer is defined as a cell gap, and the cell gap of the transmissive area is twice as thick as the cell gap of the reflective area.

27. A transflective liquid crystal display device, comprising:
- a first substrate and a second substrate;
- a plurality of data lines disposed on the first substrate;
- a first passivation layer covering an entire surface of the first substrate including the plurality of data lines;
- a second passivation layer over a portion of the first passivation layer and covering the plurality of data lines, the second passivation layer having a first opening;
- a plurality of reflectors covering a left side and a right side of one data line, one reflector overlaps the one data line by a left overlap width and an adjacent reflector overlaps the one data line by a right overlap width, and one of the plurality of reflectors provides a second opening that corresponds to the first opening;
- an inter insulating layer covering the entire surface of the first substrate including the plurality of reflectors;
- a plurality of transparent electrodes formed on the inter insulating layer, such that a portion of one transparent electrode over the one data line extends beyond a corresponding reflector, and a portion of the adjacent reflector over the one data line extends beyond a corresponding transparent electrode, wherein the one transparent electrode and the adjacent reflector define a shift width of the transparent electrode with respect to the at least one of the data line and the gate line, and is less than or equal to the distance between adjacent reflectors; and
- a liquid crystal layer interposed between the first and second substrates, wherein the first and second passivation layers, the inter insulating layer, the reflectors and the transparent electrodes include respective overlapping portions.

* * * * *